United States Patent
Giladi

(10) Patent No.: US 12,015,794 B2
(45) Date of Patent: Jun. 18, 2024

(54) METHOD AND APPARATUS FOR CONTENT-DRIVEN TRANSCODER COORDINATION

(71) Applicant: Comcast Cable Communications, LLC, Philadelphia, PA (US)

(72) Inventor: Alexander Giladi, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 35 days.

(21) Appl. No.: 17/538,601

(22) Filed: Nov. 30, 2021

(65) Prior Publication Data

US 2023/0171418 A1   Jun. 1, 2023

(51) Int. Cl.
*H04N 19/40* (2014.01)
*H04N 19/105* (2014.01)
*H04N 19/149* (2014.01)
*H04N 19/172* (2014.01)

(52) U.S. Cl.
CPC ........... *H04N 19/40* (2014.11); *H04N 19/105* (2014.11); *H04N 19/149* (2014.11); *H04N 19/172* (2014.11)

(58) Field of Classification Search
CPC ...................................................... H04N 19/40
See application file for complete search history.

(56) References Cited

U.S. PATENT DOCUMENTS

| | | | | |
|---|---|---|---|---|
| 9,344,751 B1* | 5/2016 | Ream | ............... | H04N 21/23116 |
| 2013/0272374 A1* | 10/2013 | Eswaran | ............ | H04N 21/2343 |
| | | | | 375/E7.168 |
| 2014/0140407 A1* | 5/2014 | Yu | ........................ | H04N 19/117 |
| | | | | 375/240.12 |
| 2014/0185466 A1* | 7/2014 | Syed | ........................ | H04L 43/50 |
| 2014/0185667 A1* | 7/2014 | Mcphillen | .............. | H04N 19/40 |
| | | | | 375/240.03 |
| 2015/0189222 A1* | 7/2015 | John | ................... | H04N 21/8456 |
| | | | | 348/441 |
| 2015/0281752 A1* | 10/2015 | Van Veldhuisen | ... | H04N 21/242 |
| 2016/0073120 A1* | 3/2016 | Panchagnula | ........ | H04N 19/192 |
| | | | | 375/240.02 |
| 2017/0094341 A1* | 3/2017 | Berner | ............... | H04N 21/8352 |
| 2017/0359601 A1* | 12/2017 | Sievers | ................ | H04N 9/8205 |

FOREIGN PATENT DOCUMENTS

WO   WO-2009045178 A1 *  4/2009   ........... H04N 19/107

* cited by examiner

*Primary Examiner* — Kyle M Lotfi
(74) *Attorney, Agent, or Firm* — BakerHostetler

(57) ABSTRACT

Systems and methods are described herein for coordinating transcoders. Content may be received from different sources to be transcoded. Each transcoder of a plurality of transcoders may send data associated with content to each other to coordinate the plurality of transcoders. The data may indicate timing information for the encoded content and features of the content such as, for example, color, frame similarity, or frame type. The transcoders, while outputting encoded content, may coordinate either directly or via a broker. The transcoders may coordinate in order to synchronize their output so that frames, that may be received by each transcoder at different times, are aligned based on the timing information. The coordination and synchronization may improve error resilience. In the case of a transcoder/encoder or a site failure, there may be a seamless transition to a different transcoder/encoder and no reduction in performance because of the time alignment.

20 Claims, 6 Drawing Sheets

METHOD AND APPARATUS FOR CONTENT-DRIVEN TRANSCODER COORDINATION

BACKGROUND

Video content providers may encode the same content using multiple transcoders. The content may also be received from different video sources. For example, when there are a large number of adaptive bitrate (ABR) representations and the encoding is very CPU-intensive (e.g., Ultra-high-definition (Ultra HD) resolutions and frame rates), multiple transcoders may be used to generate all representations. Hence, there may be multiple machines that are each creating a subset of representations. Accordingly, there is a need for improved techniques for transcoder coordination and for encoding and subsequent packaging and delivery of the content.

SUMMARY

Systems and methods are described herein for coordinating transcoders during content processing and delivery. Each transcoder of a plurality of transcoders may send data associated with content to each other to coordinate the plurality of transcoders. The data may indicate timing information for the encoded content and features of the content such as, for example, color, frame similarity, or frame type. The transcoders, while outputting encoded content, may coordinate between each other either directly or via a broker. The transcoders may coordinate in order to synchronize their output so that frames, that may be received by each transcoder at different times, are aligned. The coordination and synchronization may improve error resilience. One implementation of the disclosed techniques is to accommodate handling of multiple input sources of an item of video content, where multiple encoders need to encode content to allow for seamless switching between encoders that encode the same content from different sources. For example, in the case of a transcoder/encoder or a site failure, there may be a seamless transition to a different transcoder/encoder and no reduction in performance because of the time alignment.

BRIEF DESCRIPTION OF THE DRAWINGS

The following drawings show generally, by way of example, but not by way of limitation, various examples discussed in the present disclosure. In the drawings.

DETAILED DESCRIPTION OF ILLUSTRATIVE EMBODIMENTS

Figure 1:
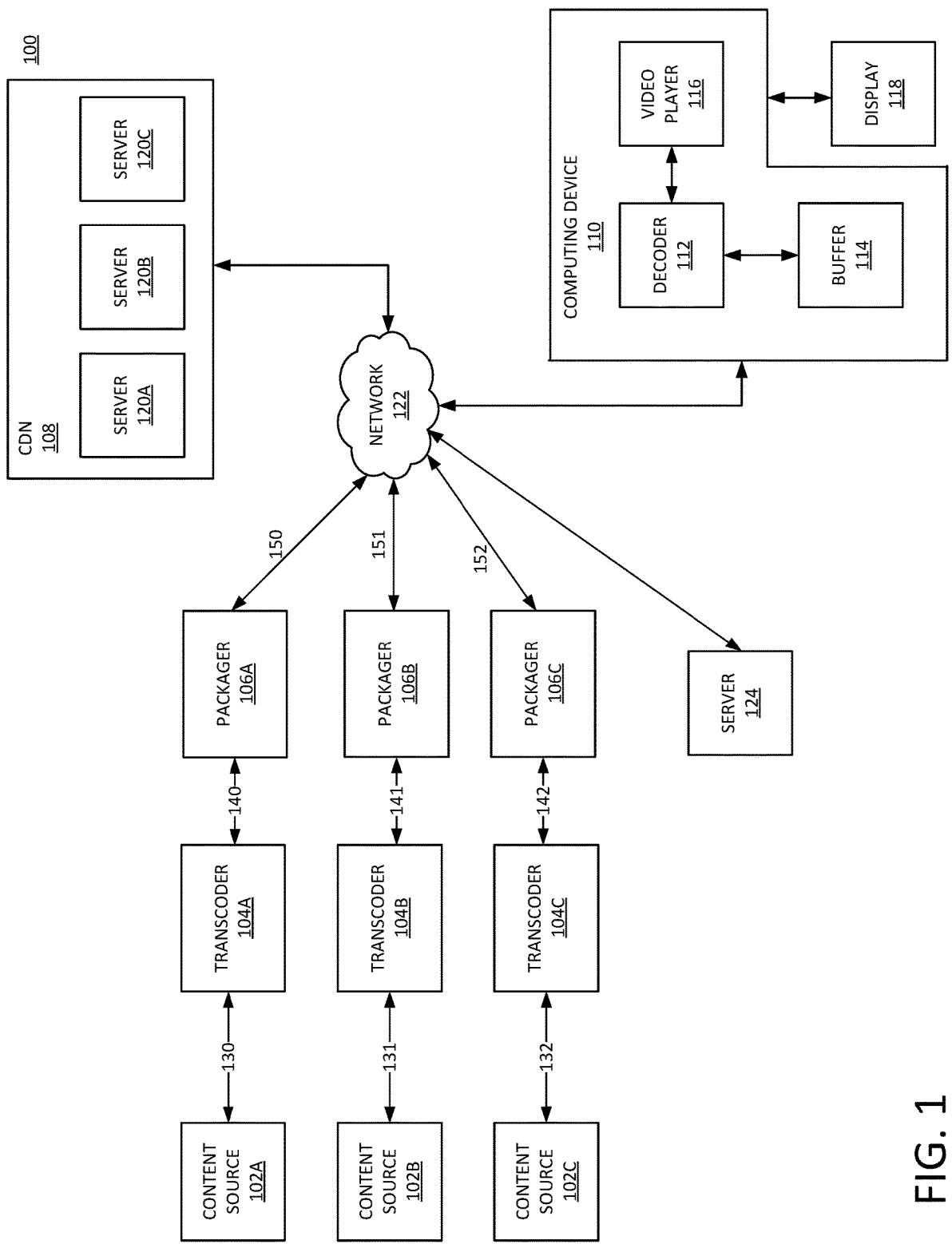
FIG. 1 shows an example system.

Systems and methods are described herein for processing content. The systems and methods described herein may use data associated with the content to coordinate a plurality of transcoders/encoders. The terms transcoder and encoder may be used interchangeably herein. The terms transcode and encode may be used interchangeably herein. The transcoders, while outputting encoded content, may coordinate between each other either directly or via a broker. The transcoders may coordinate in order to synchronize their output so that frames, that may be received by each transcoder at different times, and/or from different input sources are aligned. The coordination and synchronization may improve error resilience. For example, in the case of a transcoder/encoder or a site failure, there may be a seamless transition to a different transcoder/encoder and no reduction in performance because of the time alignment. The different transcoder/encoder may be receiving content from a different input source, but no reduction in performance may occur because of the time alignment.

The plurality of transcoders may be encoding the same content. Each transcoder of the plurality of transcoders may report data along with timing information usable by other transcoders of the plurality of transcoders. The timing information may comprise, for example, a timestamp. The timestamp may indicate a presentation time of a frame. The data associated with the content may indicate features of the content. The content features may comprise, for example, pixel color, texture statistics such as histograms of edges and gradients, or similarity between consecutive frames. The similarity between consecutive frames may be indicated by statistics resulting from motion estimation and histogram differences such as a sum of absolute transformed differences (SATD). The data may indicate a frame type such as an intra-coded picture (I-frame), a bidirectional predicted picture (B-frame), or a predicted picture (P-frame). The data may indicate one or more reference lists. The data and timing information communicated among the plurality of transcoders may enable the coordination.

The transcoders/encoders may be located in different data centers encoding the same video. In the case of a transcoder/encoder or a site failure, a seamless transition may be made between different transcoder/encoders. Moreover, different transcoders may be getting their input from the broadcaster facility via different input sources (e.g., different content sources or channels) to avoid input failure. For example, the primary input may comprise a high-quality, high-rate contribution format (such as JPEG2000 at 300 Mbit/sec) over fiber, while a secondary source may comprise an H.264 video over satellite at 6 Mbit/sec. In the latter case, the latencies (e.g., the period between the moment a given picture is created and the moment it is decoded at the transcoder machine) may differ as well because H.264 transcoding and the delays caused by satellite transmission may delay the secondary signal.

The use cases described above rely on identical pictures having identical timestamps allowing for switching from one encoder output to the other, in both the case of a failure or in the case of a routine rate adaptation. For example, if the picture was created at time $T_0$, its presentation time, as understood by the decoder, needs to be $T_0+\Delta$, with identical values of $\Delta$ across all transcoders, regardless of the input path and physical machine doing the transcoding. Another failover scenario occurs when linear transcoders/encoders are running on non-permanent instances in the cloud, such as Amazon Web Services (AWS) spot instances. If the transcoder is warned of a pending shutdown of an instance, a new instance can be created and needs to be synchronized with the encoder on the instance scheduled to go down. Additionally, by communicating the data and timing information among the plurality of transcoders using the techniques described herein, a system may be able to determine whether a video source is corrupt, degraded, or incorrect.

For example, the data associated with the content may indicate histograms of edges and gradients, and each histogram may indicate statistical data associated with a feature including but not limited to color, a histogram of oriented gradients (HOG) (or a histogram derived from it), a measure of similarity between or among consecutive frames. These histograms may be further quantized. The statistical data may be independent of resolution, interlacing, frame rate, timing, or timestamp information.

The data may be sent to the other transcoders of the plurality of transcoders using a plurality of Internet Protocol (IP) multicast packets and using a protocol such as Unreliable Data Protocol (UDP). The UDP packets may be sent in an uncoordinated fashion. Alternatively or additionally, the information may be sent to a central server. The central server may operate as a broker between transcoders and may cause timestamp information to be available as a part of encoder orchestration or process. Alternatively or additionally, the information may be communicated via a message broker system using protocols such as Advanced Message Queuing Protocol (AMQP).

If there was timed metadata such as a Society of Cable Telecommunications Engineers (SCTE) 35 cue message associated with a particular frame of the plurality of frames, it may also be included in the transmission among the plurality of transcoders. Timing expressed in the input via other means (e.g., genlock, supplemental enhancement information (SEI) messages, SMPTE timecode, etc.) may also be included in the transmission.

On startup, an encoder/transcoder of the plurality of encoders/transcoders may receive, from other transcoders of the plurality of transcoders, messages comprising the data indicating the one or more source content features. The transcoder may determine data associated with features of content received via its input source (e.g., the input channel that the transcoder is encoding). The transcoder may then compare the data in the received messages with its own determined data. The transcoder may determine, based on the data in the received messages and its own determined data, a sequence of common frames (e.g. a sequence of 10-15 sec with near-identical features or one where some pre-configured number of consecutive scene changes match). The transcoder may derive timing information (e.g., timestamps) associated with its input source/channel. The transcoder may synchronize the timing information for the frames that it is encoding via its input source/channel with the timing information for the frames indicated by the received data (i.e., the transcoder may establish a frame-to-timestamp correspondence). Once synchronized, the transcoder may start sending data indicative of the features of content received via its input channel. It may also encode frames with frame types identical to those contained in its input data and possibly using reference lists.

The data exchanged between transcoders can be also displayed by an interface of a computing device. The interface may comprise a control module. The control module may provide status information to a user. The computing device may determine, based on the received data, to perform an automated failover decision. For example, the interface may provide an indication when features reported by transcoders will diverge, or when the input features indicate input problems (non-changing features, black/green frames, etc.). When there is a presence of input issues, (e.g., "stuck" frames, decode errors, overall link failure) the system may automatically switch to the functional highest-quality input.

When the histogram indicates a measure of similarity between or among consecutive frames, the statistical data may comprise pixel differences (e.g., peak signal-to-noise ratio (PSNR)) between or among a plurality of frames or differences between or among edges of a plurality of frames. The statistics may also comprise more complex statistics such as a histogram of a sum of absolute differences (SAD) or SATD values resulting from executing the same motion estimation algorithm on the plurality of frames.

Each histogram may comprise a sample associated with a plurality of bins. The histogram may be processed before transmission by quantizing the bins. For example, when a 10-bit sample is used for a bin, it may be quantized down to an 8-bit or 6-bit sample to reduce its size and to enable faster comparison operations. The histograms may be further translated into percentages of a bin vs a total, and these percentages can be expressed using a set amount of bits (e.g. 8 or 16). Range information associated with the histograms may be transmitted. Range information may indicate whether a range is full vs narrow, whether [16, 235] or [0, 255] pixel values are expected for 8-bit pixel samples, etc. Alternatively, the histograms may be normalized (e.g., to a narrow range). Histograms data may be associated with one or more dimensions. For example, the histogram information may be associated with three-dimensions (for each combination of Y, Cb, and Cr), two-dimensions+one-dimension (separately Y as 1D and Cb/Cr as 2D), or three one-dimension histograms (one for each component). The histograms may use a different colorspace, such as RGB.

FIG. 1 shows system 100 configured for video processing. The system 100 may comprise content sources 102A, 102B, 102C, encoders/transcoders 104A, 104B, 104C, packagers 106A, 106B, 106C, a content delivery network (CDN) 108, and a computing device 110. The system 100 may be configured to coordinate/synchronize data associated with features in encoded video and timing information associated with the video among the encoders/transcoders 104A, 104B, 104C. The techniques for video processing described herein are applicable to any delivery method including but not limited to adaptive streaming (e.g., Dynamic Adaptive Streaming over Hypertext Transfer Protocol (HTTP) (DASH), HTTP Live Streaming (HLS)), traditional Moving Picture Experts Group (MPEG)-2 transport stream (TS) based transmission that is customarily used in terrestrial broadcasts (e.g., Advanced Television Systems Committee (ATSC) 1.0), cable, Internet Protocol television (IPTV), or segmented broadcast distribution using systems (ATSC 3.0, or 3rd Generation Partnership Project (3GPP) File Delivery Over Unidirectional Transport (FLUTE)).

The content sources 102A, 102B, 102C, the encoders/transcoders 104A, 104B, 104C, the CDN 108, the computing device 110, and/or any other component of the system 100 may be interconnected via a network 122. The network 122 may comprise a wired network, a wireless network, or any combination thereof. The network 122 may comprise a public network, such as the Internet. The network 122 may comprise a private network, such as a content provider's distribution system. The network 122 may communicate using technologies such as WLAN technology based on the Institute of Electrical and Electronics Engineers (IEEE) 802.11 standard, wireless cellular technology, Bluetooth, coaxial cable, Ethernet, fiber optics, microwave, satellite, Public Switched Telephone Network (PTSN), Digital Subscriber Line (DSL), BPL, or any other appropriate technologies.

The computing device 110 may comprise a television, a monitor, a laptop, a desktop, a smart phone, a set-top box, a cable modem, a gateway, a tablet, a wearable computing device, a mobile computing device, any computing device configured to receive and/or render content, the like, and/or any combination of the foregoing. The computing device 110 may comprise a decoder 112, a buffer 114, and a video player 116. The computing device 110 (e.g., the video player 116) may be communicatively connected to a display 118. The display 118 may be a separate and discrete component from the computing device 110, such as a television display connected to a set-top box. The display 118 may be integrated with the computing device 110. The decoder 112, the video player 116, the buffer 114, and the display 118 may be realized in a single device, such as a laptop or mobile device. The decoder 112 may decompress/decode encoded video data. The encoded video data may be received from the encoders/transcoders 104A, 104B, 104C, packagers 106A, 106B, 106C, or the CDN 108.

The content sources 102A, 102B, 102C may comprise different input sources of the same content from a provider. For example, the content sources 102A, 102B, 102C may comprise a broadcast source, a headend, a server, a video on-demand server, a cable modem termination system, the like, and/or any combination of the foregoing. The content sources 102A, 102B, 102C may send the same content 130, 131, 132 to the encoders/transcoders 104A, 104B, 104C. The content 130, 131, 132 may comprise video frames or other images. For example, the content 130, 131, 132 may comprise uncompressed, raw video data comprising a sequence of frames. For example, the content 130, 131, 132 may comprise video frames in an MPEG-Single Program Transport Stream (MPEG-SPTS). Video frames may comprise pixels. A pixel may comprise a smallest controllable element of a video frame. A video frame may comprise bits for controlling each associated pixel. A portion of the bits for an associated pixel may control a luma value (e.g., light intensity) of each associated pixel. A portion of the bits for an associated pixel may control one or more chrominance value (e.g., color) of the pixel. The content sources 102A, 102B, 102C may receive requests for content from the encoders/transcoders 104A, 104B, 104C, the packagers 106A, 106B, 106C, the computing device 110, or the CDN 108.

The content sources 102A, 102B, 102C may send the content 130, 131, 132 to the to the encoders/transcoders 104A, 104B, 104C based on a request for content from the to the encoders/transcoders 104A, 104B, 104C, the packagers 106A, 106B, 106C, the computing device 110, or the CDN 108. The encoders/transcoders 104A, 104B, 104C may transcode the content 130, 131, 132 into one or more output streams 140, 141, 142. For example, the one or more output streams 140, 141, 142 may comprise the same content for redundancy purposes. The one or more output streams 140, 141, 142 may comprise video encoded with a different resolution and/or a different bit rates.

The packagers 106A, 106B, 106C may receive the one or more output streams 140, 141, 142 from the encoders/transcoders 104A, 104B, 104C. The packagers 106A, 106B, 106C may generate one or more streams 150, 151, 152. The one or more streams 150, 151, 152 may comprise, for example, different ABR streams associated with different streaming formats. The one or more streams 150, 151, 152 may comprise segments or fragments of video and a manifest. The manifest may indicate availability of the stream and segments/fragments and information for requesting the segments/fragments (e.g., via a Uniform Resource Locator (URL)). The packagers 106A, 106B, 106C may send the one or more streams 150, 151, 152 to the CDN 108.

The CDN 108 may comprise one or more computing devices such as servers 120A, 120B, 120C. The one or more servers 120A, 120B, 120C of the CDN 108 may be configured to act as intermediary servers located between the computing device 110 and the content sources 102A, 102B, 102C. The one or more servers 120A, 120B, 120C of the CDN 108 may serve cached content to the computing device 110. The cached content may comprise video content such as one or more video segments. The CDN 108 may receive a request for video from the computing device 110. The CDN 108 may authorize/authenticate the request and/or the computing device 110 from which the request originated. The request for video data may comprise one or more of a request for a channel, a video on-demand asset, a website address, a video asset associated with a streaming service, the like, and/or any combination of the foregoing. The request may be sent via HTTP. The CDN 108 may send the request to the content sources 102A, 102B, 102C.

The encoders/transcoders 104A, 104B, 104C may comprise encoders, which for encode/transcode the content received from the content sources 102A, 102B, 102C. The encoders/transcoders 104A, 104B, 104C may be encoding/transcoding the same content for redundancy purposes. The content sources 102A, 102B, 102C and the encoders/transcoders 104A, 104B, 104C may be co-located at a premises, located at separate premises, or associated with separate instances in the cloud. The content sources 102A, 102B, 102C may send uncompressed video data to the encoders/transcoders 104A, 104B, 104C based on a request for video from the encoders/transcoders 104A, 104B, 104C, the computing device 110, or the CDN 108. When video data is transmitted from one location to another, the encoder/transcoder, of the encoders/transcoders 104A, 104B, 104C, may encode the video (e.g., into a compressed format) using a compression technique prior to transmission.

Encoding video, such as the encoding performed by each of the encoders/transcoders 104A, 104B, 104C, may comprise partitioning a frame of video data into a plurality of coding tree units (CTUs) or macroblocks that each comprising a plurality of pixels. CTUs may be partitioned into coding units (CUs). Macroblocks may be partitioned into partitions. The encoder may generate a prediction of each current CU based on previously encoded data. The prediction may comprise intra-prediction, which is based on previously encoded data of the current frame being encoded. The prediction may comprise inter-prediction, which is based on previously encoded data of a previously encoded reference frame. The inter-prediction stage may comprise determining a prediction unit (PU) (e.g., a prediction area) using motion compensation by determining a PU that best matches a prediction region in the CU. The encoder may generate a residual signal by determining a difference between the determined PU from the prediction region in the CU. The residual signals may then be transformed using, for example, a discrete cosine transform (DCT), which may generate coefficients associated with the residuals. The encoder may then perform a quantization process to quantize the coefficients. The transformation and quantization processes may be performed on transform units (TUs) based on partitions of the CUs. The compressed bitstream comprising video frame data may then be transmitted by the encoder. The transmitted compressed bitstream may comprise the quantized coefficients and information to enable the decoder to regenerate the prediction blocks, such as motion vector associated with the motion compensation. The decoder may receive the compressed bitstream and may decode the compressed bitstream to regenerate the video content.

The content sources 102A, 102B, 102C may transmit requested uncompressed video data to the encoders/transcoders 104A, 104B, 104C. The pathway of the video to each transcoder of the encoders/transcoders 104A, 104B, 104C may be different. The content 130, 131, or 132 may be received by the encoders/transcoders 104A, 104B, 104C from the content sources 102A, 102B, 102C via the various input channels of the content sources 102A, 102B, 102C. For example, a first encoder of the encoders/transcoders 104A, 104B, 104C may receive the video via a fiber connection, a second encoder of the encoders/transcoders 104A, 104B, 104C may receive the video via a satellite connection, and a third transcoder of the encoders/transcoders 104A, 104B, 104C may receive the video via a wireless connection.

The encoders/transcoders 104A, 104B, 104C may receive the uncompressed video data from the different content sources 102A, 102B, 102C (either through the same channel/format or via different ones as in the aforementioned example). The encoders/transcoders 104A, 104B, 104C may then encode (e.g., compress) the uncompressed video data to generate the requested encoded video data. The encoders/transcoders 104A, 104B, 104C may send the encoded video data to the requesting component, such as the CDN 108 or the computing device 110.

The encoders/transcoders 104A, 104B, 104C may send the data along with timing information usable by other encoders/transcoders of the encoders/transcoders 104A, 104B, 104C to cause coordination among each other either directly or via a broker (e.g., the server 124). The encoders/transcoders 104A, 104B, 104C may coordinate in order to synchronize their output so that frames, that may be received by each transcoder of the encoders/transcoders 104A, 104B, 104C at different times, are aligned. The coordination and synchronization may improve error resilience. For example, in the case of a transcoder/encoder, of the encoders/transcoders 104A, 104B, 104C, or a site failure, there may be a seamless transition to a different transcoder/encoder, of the encoders/transcoders 104A, 104B, 104C, and no reduction in performance because of the time alignment.

The timing information may comprise, for example, a timestamp associated with each frame of a plurality of frames being encoded by the encoders/transcoders 104A, 104B, 104C. The timestamp may indicate a presentation time of a frame. The data associated with the content may indicate features of the content. The content features may comprise, for example, pixel color, texture statistics such as histograms of edges and gradients, or similarity between consecutive frames. The similarity between consecutive frames may be indicated by statistics resulting from motion estimation and histogram differences such as SATD. The data may indicate a frame type such as an I-frame, a B-frame, or a P-frame. The data may indicate one or more reference lists.

The data and the timing information may be communicated via network 122 and/or via the server 124 operating as a broker. For example, the server 124 may be associated with the content sources 102A, 102B, 102C. The data and timing information communicated among the encoders/transcoders 104A, 104B, 104C may enable the coordination by the system 100. The coordination may comprise failover from one transcoder of the encoders/transcoders 104A, 104B, 104C to another transcoder of the encoders/transcoders 104A, 104B, 104C. The system 100 may be able to send portions of video encoded by different encoders/transcoders of the encoders/transcoders 104A, 104B, 104C for decoding by the computing device 110.

For example, the respective input channels providing content 130, 131, 132 from the content sources 102A, 102B, 102C may become corrupt, degraded, or incorrect. The one or more servers 120A, 120B, 120C or broker server 124 may determine that encoded video from a transcoder of the encoders/transcoders 104A, 104B, 104C with video that is not corrupt, degraded, or incorrect is to be sent to the computing device 110. The CDN 108 may then send the requested encoded video data to the requesting computing device 110 via the transcoder of the encoders/transcoders 104A, 104B, 104C that is not experiencing quality issues.

In another example, the respective input channels providing content 130, 131, 132 from the content sources 102A, 102B, 102C may have failed. The one or more servers 120A, 120B, 120C or broker server 124 may determine that a transcoder of the encoders/transcoders 104A, 104B, 104C is inoperable. The CDN 108 may then send the requested encoded video data to the requesting computing device 110 via a transcoder of the encoders/transcoders 104A, 104B, 104C that is still operational.

Figure 2:
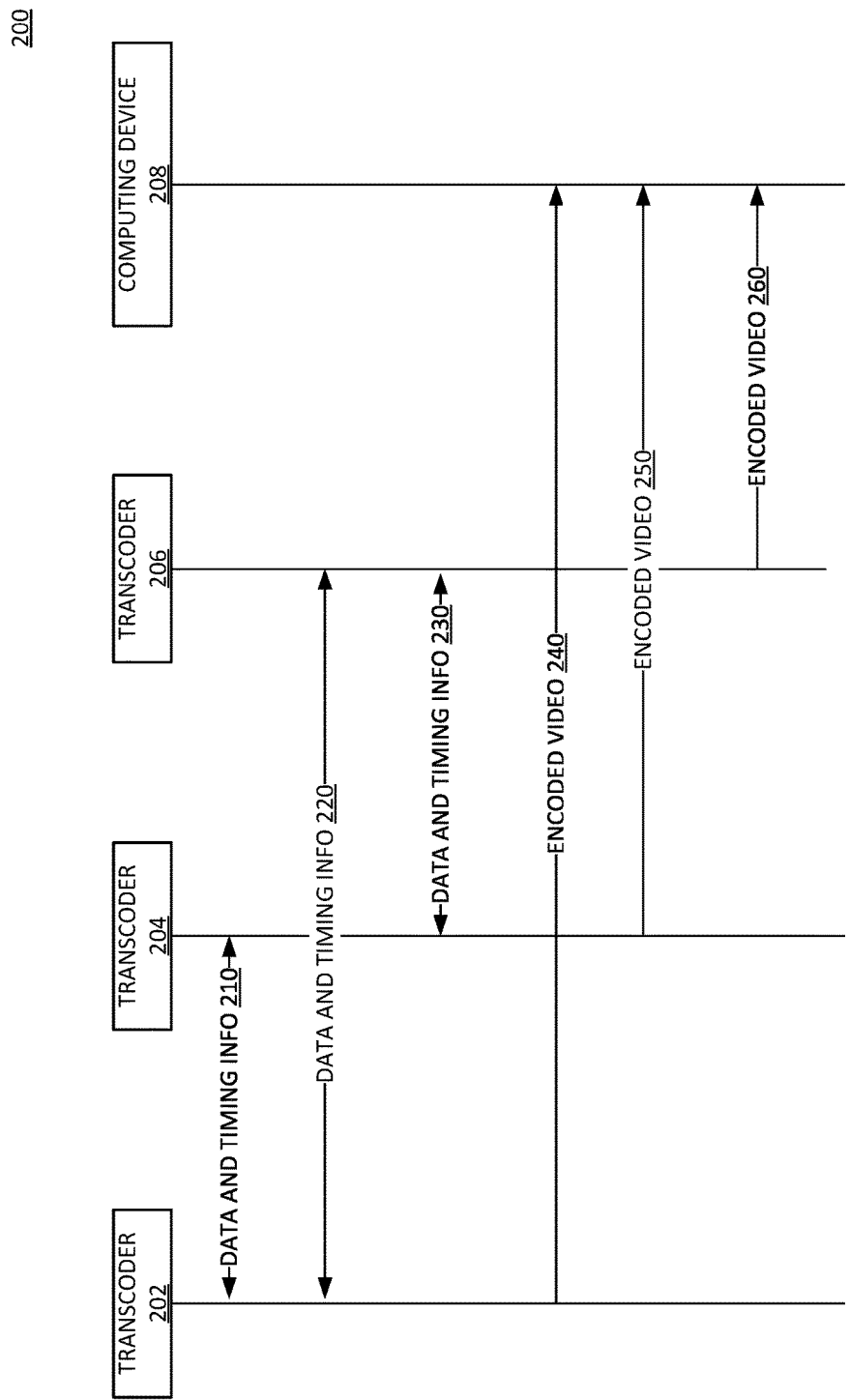
FIG. 2 shows an example call flow.

FIG. 2 shows an example call flow 200. Transcoders 202, 204, and 206, while outputting encoded video, may coordinate between each other in order to synchronize their output so that frames, that may be received by each transcoder at different times, are aligned. The coordination and synchronization may improve error resilience. For example, in the case of a transcoder/encoder or a site failure, there may be a seamless transition to a different transcoder/encoder and no reduction in performance because of the time alignment. The transcoders 202, 204, and 206 may be located in different data centers encoding the same video.

The transcoders 202, 204, and 206 may be encoding the same linear channel. Each transcoder 202, 204, and 206 may communicate data and timing information 210, 220, and 230 with each other. The timing information may comprise, for example, a timestamp. The timestamp may indicate a presentation time of a frame. The data associated with the content may indicate features of the content. The content features may comprise, for example, pixel color, texture statistics such as histograms of edges and gradients, or similarity between consecutive frames. The similarity between consecutive frames may be indicated by statistics resulting from motion estimation and histogram differences such as SATD. The data may indicate a frame type such as an I-frame, a B-frame, or a P-frame. The data may indicate one or more reference lists. The data and timing information communicated among the plurality of transcoders may enable the coordination.

In the case of a transcoder/encoder or a site failure a seamless transition may be made between different transcoder/encoders. For example, the system may determine that the encoded video 240, being sent from transcoder 202 to computing device 208 for playback, has been degraded/corrupted or is incorrect/incomplete. Because the transcoders 202, 204, and 206 are coordinated and synchronized, transcoder 204 may begin sending encoded video 250 to computing device 208 for playback. Further, because the transcoders 202, 204, and 206 are coordinated and synchronized, transcoder 206 may begin sending encoded video 260 to computing device 208 for playback.

Figure 3:
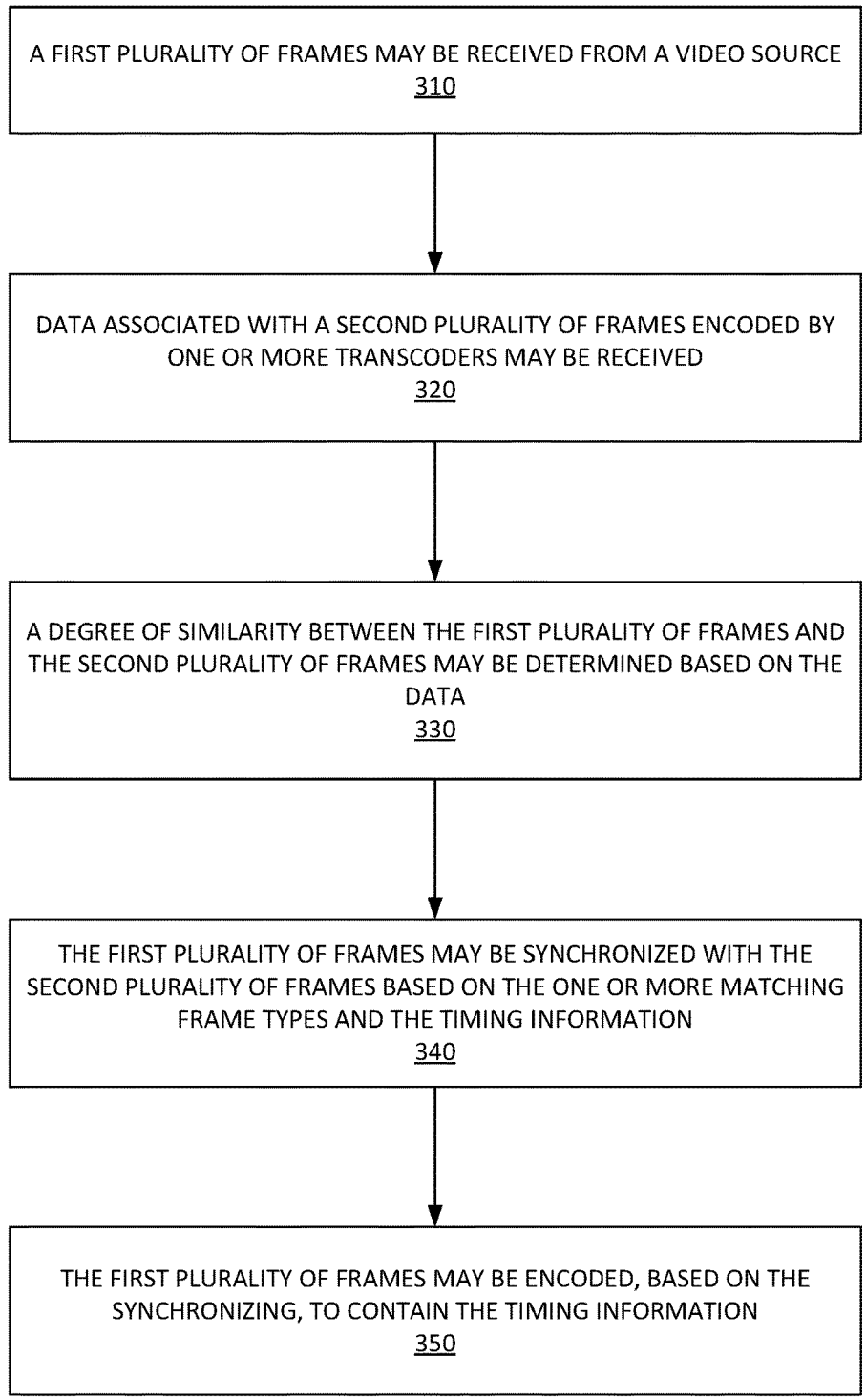
FIG. 3 shows an example method.

FIG. 3 shows an example method 300. The method 300 of FIG. 3 may be performed, for example, by the encoders/transcoders 104A, 104B, 104C, the computing device 110, or a server of one or more servers 120A, 120B, 120C of the CDN 108 of FIG. 1. While each step in the method 300 of FIG. 3 is shown and described separately, multiple steps may be executed in a different order than what is shown, in parallel with each other, or concurrently with each other. At step 310, a first plurality of frames may be received from a video source.

At step 320, data associated with a second plurality of frames encoded by one or more transcoders may be received. The first plurality of frames and the second plurality of frames may be associated with different input channels, which may be based on a fiber connection, a satellite connection, or a wireless connection. The data may be received from a server operating as a broker between the one or more transcoders or from the one or more transcoders. The data may indicate, for each frame of the second plurality of frames, a frame type and timing information. The data may comprise statistical information resulting from motion estimation. The statistical information may comprise, for example, a measure of similarity between consecutive frames of the plurality of frames, SATD, SAD, a HOG, a quantized HOG, a histogram of edges, or a quantized histogram of edges. The timing information may comprise a timestamp for each frame of the second plurality of frames that the one or more transcoders are encoding. Each transcoder of the one or more transcoders may be located at a different data center or associated with a different instance in a cloud platform.

At step 330, a degree of similarity between the first plurality of frames and the second plurality of frames may be determined based on the data. The degree of similarity may indicate one or more matching frame types in the first plurality of frames and the second plurality of frames. The one or more matching frame types may indicate a similarity between one or more motion vectors, a matching color, or a matching resolution.

At step 340, the first plurality of frames may be synchronized with the second plurality of frames based on the one or more matching frame types and the timing information. The synchronizing may comprise synchronizing, based on the one or more matching frame types and the timing information, a timestamp for each frame of the first plurality of frames to correspond with a timestamp in a frame of the second plurality of frames. At step 350, the first plurality of frames may be encoded, based on the synchronizing, to contain the timing information. The encoded first plurality of frames may be sent to a computing device for playback. Further, information may be received indicating that the one or more transcoders are encoding a degraded input channel and are discontinuing encoding of the second plurality of frames, and sending of the encoded first plurality of frames to a second computing device for playback may be caused based on the information.

Figure 4:
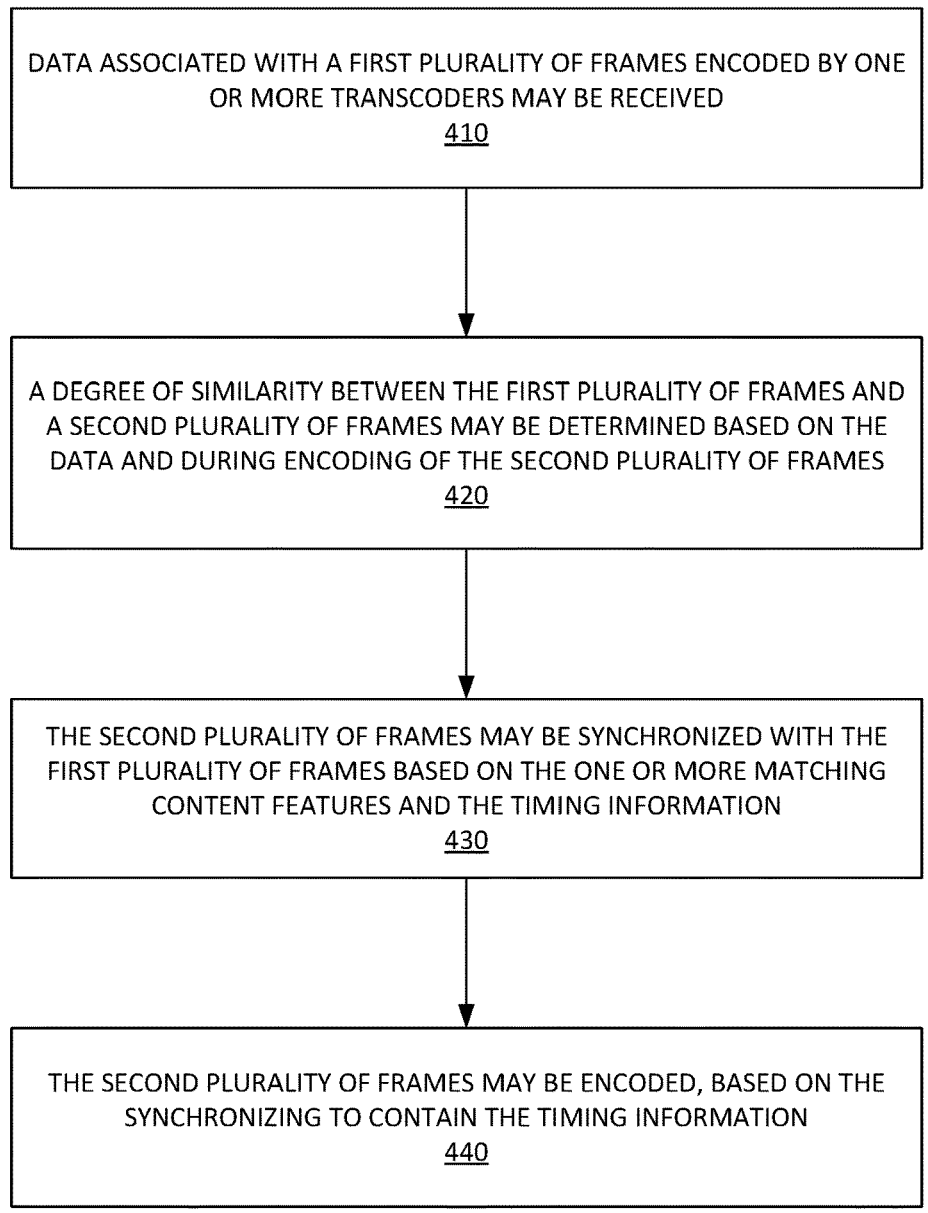
FIG. 4 shows an example method.

FIG. 4 shows an example method 400. The method 400 of FIG. 4 may be performed, for example, by the encoders/transcoders 104A, 104B, 104C, the computing device 110, or a server of one or more servers 120A, 120B, 120C of the CDN 108 of FIG. 1. While each step in the method 400 of FIG. 4 is shown and described separately, multiple steps may be executed in a different order than what is shown, in parallel with each other, or concurrently with each other.

At step 410, data associated with a first plurality of frames encoded by one or more transcoders may be received. The data may be received from a server operating as a broker between the one or more transcoders or from the one or more transcoders. The data may indicate, for each frame of the first plurality of frames, a frame type and timing information. The data may comprise statistical information resulting from motion estimation. The statistical information may comprise, for example, a measure of similarity between consecutive frames of the plurality of frames, SATD, SAD, a HOG, a quantized HOG, a histogram of edges, or a quantized histogram of edges. The timing information may comprise a timestamp for each frame of the first plurality of frames that the one or more transcoders are encoding. Each transcoder of the one or more transcoders may be located at a different data center or associated with a different instance in a cloud platform.

At step 420, a degree of similarity between the first plurality of frames and a second plurality of frames may be determined based on the data and during encoding of the second plurality of frames. The degree of similarity may indicate one or more matching content features in the first plurality of frames and the second plurality of frames. The one or more matching content features may comprise a frame type, a similarity between one or more motion vectors, a color, or a resolution. The first plurality of frames and the second plurality of frames may be associated with different input channels, which may be based on a fiber connection, a satellite connection, or a wireless connection.

At step 430, the second plurality of frames may be synchronized with the first plurality of frames based on the one or more matching content features and the timing information. The synchronizing may comprise synchronizing, based on the one or more matching content features and the timing information, a timestamp for each frame of the first plurality of frames to correspond with a timestamp in a frame of the second plurality of frames. At step 440, the second plurality of frames may be encoded, based on the synchronizing, to contain the timing information. The encoded second plurality of frames may be sent to a computing device for playback. Further, information may be received indicating that the one or more transcoders are encoding a degraded input channel and are discontinuing encoding of the first plurality of frames, and sending of the encoded second plurality of frames to a second computing device for playback may be caused based on the information.

Figure 5:
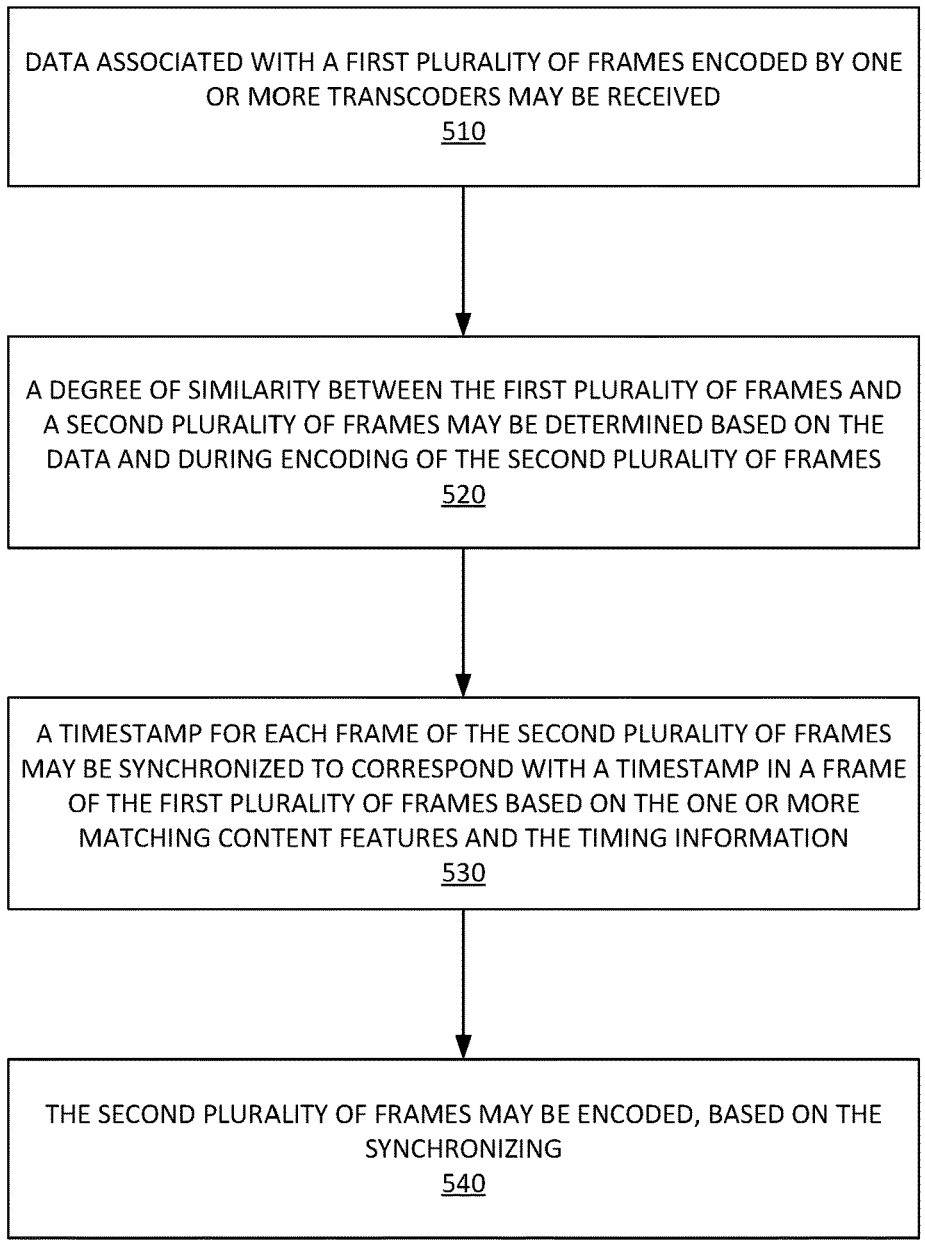
FIG. 5 shows an example method.

FIG. 5 shows an example method 500. The method 500 of FIG. 5 may be performed, for example, by the encoders/transcoders 104A, 104B, 104C, the computing device 110, or a server of one or more servers 120A, 120B, 120C of the CDN 108 of FIG. 1. While each step in the method 500 of FIG. 5 is shown and described separately, multiple steps may be executed in a different order than what is shown, in parallel with each other, or concurrently with each other.

At step 510, data associated with a first plurality of frames encoded by one or more transcoders may be received. The data may be received from a server operating as a broker between the one or more transcoders or from the one or more transcoders. The data may indicate, for each frame of the first plurality of frames, a frame type and timing information. The data may comprise statistical information resulting from motion estimation. The statistical information may comprise, for example, a measure of similarity between consecutive frames of the plurality of frames, SATD, SAD, a HOG, a quantized HOG, a histogram of edges, or a quantized histogram of edges. The timing information may comprise a timestamp for each frame of the first plurality of frames that the one or more transcoders are encoding. Each transcoder of the one or more transcoders may be located at a different data center or associated with a different instance in a cloud platform.

At step 520, a degree of similarity between the first plurality of frames and a second plurality of frames may be determined based on the data and during encoding of the second plurality of frames. The degree of similarity may indicate one or more matching content features in the first plurality of frames and the second plurality of frames. The one or more matching content features may comprise a frame type, a similarity between one or more motion vectors, a color, or a resolution. The first plurality of frames and the second plurality of frames may be associated with different input channels, which may be based on a fiber connection, a satellite connection, or a wireless connection.

At step 530, a timestamp for each frame of the second plurality of frames may be synchronized to correspond with a timestamp in a frame of the first plurality of frames based on the one or more matching content features and the timing information. At step 540, the second plurality of frames may be encoded, based on the synchronizing. The encoded second plurality of frames may be sent to a computing device for playback. Further, information may be received indicating that the one or more transcoders are encoding a degraded input channel and are discontinuing encoding of the first plurality of frames, and sending of the encoded second plurality of frames to a second computing device for playback may be caused based on the information.

Figure 6:
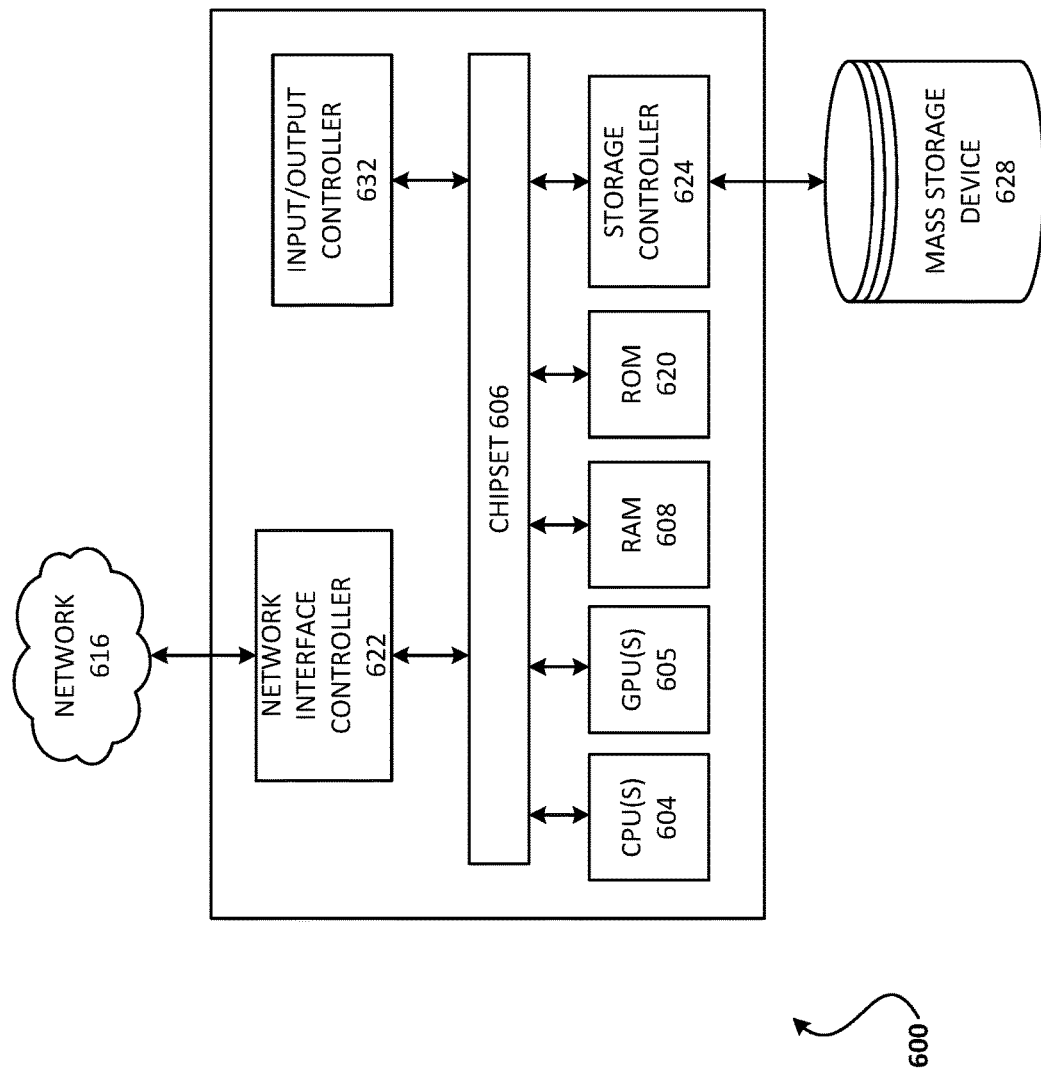
FIG. 6 depicts an example computing device.

FIG. 6 depicts a computing device 600 that may be used in various aspects, such as the servers, encoders, computing device, and other devices depicted in FIG. 1. With regard to the example architectures of FIG. 1, the devices may each be implemented in an instance of a computing device 600 of FIG. 6. The computer architecture shown in FIG. 6 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 2-5.

The computing device 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random access memory (RAM) 608 used as the main memory in the computing device 600. The chipset 606 may further provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems through local area network (LAN) 616. The chipset 606 may include functionality for providing network connectivity through a network interface controller (NIC) 622, such as a gigabit Ethernet adapter. A NIC 622 may be capable of connecting the computing device 600 to other computing nodes over a network 616. It should be appreciated that multiple NICs 622 may be present in the computing device 600, connecting the computing device to other types of networks and remote computer systems.

The computing device 600 may be connected to a mass storage device 628 that provides non-volatile storage for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a mass storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 628 is characterized as primary or secondary storage and the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may further read information from the mass storage device 628 by detecting the physical states or characteristics of one or more particular locations within the physical storage units.

In addition to the mass storage device 628 described herein, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, transitory computer-readable storage media and non-transitory computer-readable storage media, and removable and non-removable media implemented in any method or technology.

Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described herein. The computing device 600 may have access to computer-readable storage media storing computer-executable instructions, which, when executed by the computing device 600, may perform the methods described in relation to FIGS. 2-5.

A computing device, such as the computing device 600 depicted in FIG. 6, may also include an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

As described herein, a computing device may be a physical computing device, such as the computing device 600 of FIG. 6. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   receiving, from a video source, a first plurality of frames;
   receiving data associated with a second plurality of frames encoded by one or more transcoders, wherein the data indicates, for each frame of the second plurality of frames, a frame type and timing information;
   determining, based on the data, a degree of similarity between the first plurality of frames and the second plurality of frames, wherein the degree of similarity indicates one or more matching frame types;
   synchronizing, based on the one or more matching frame types and the timing information, the first plurality of frames with the second plurality of frames; and
   encoding, based on the synchronizing, the first plurality of frames to contain the timing information.

2. The method of claim 1, further comprising:
   sending of the encoded first plurality of frames to a computing device for playback.

3. The method of claim 1, wherein the receiving data comprises:
   receiving, from a server operating as a broker between the one or more transcoders, the data, or
   receiving, from the one or more transcoders, the data.

4. The method of claim 1, further comprising:
   receiving information indicating that the one or more transcoders are encoding a degraded input channel and are discontinuing encoding of the second plurality of frames; and
   causing, based on the information, sending of the encoded first plurality of frames to a second computing device for playback.

5. The method of claim 1, wherein the first plurality of frames and the second plurality of frames are associated with different input channels.

6. The method of claim 1, wherein the data comprises statistical information resulting from motion estimation, and wherein the statistical information comprises at least one of:

a measure of similarity between consecutive frames of the plurality of frames,
a sum of absolute transformed differences (SATD),
a sum of absolute differences (SAD),
a histogram of oriented gradients (HOG),
a quantized HOG,
a histogram of edges, or
a quantized histogram of edges.

7. The method of claim 1, wherein the timing information comprises a timestamp, and wherein the synchronizing the first plurality of frames comprises:
synchronizing, based on the matching and the timing information, a timestamp for each frame of the first plurality of frames to correspond with a timestamp in a frame of the second plurality of frames.

8. The method of claim 1, wherein each transcoder of the plurality of transcoders is located at a different data center or associated with a different instance in a cloud platform.

9. The method of claim 1, wherein the one or more matching frame types indicate at least one of: a similarity between one or more motion vectors, a matching color, or a matching resolution.

10. A method comprising:
receiving data associated with a first plurality of frames encoded by one or more transcoders, wherein the data indicates, for each frame of the first plurality of frames, a frame type and timing information;
determining, based on the data and during encoding of a second plurality of frames, a degree of similarity between the first plurality of frames and the second plurality of frames, wherein the degree of similarity indicates one or more matching content features;
synchronizing, based on the one or more matching content features and the timing information, the second plurality of frames with the first plurality of frames; and
encoding, based on the synchronizing, the second plurality of frames to contain the timing information.

11. The method of claim 10, wherein the receiving data comprises:
receiving, from a server operating as a broker between the one or more transcoders, the data, or
receiving, from the one or more transcoders, the data.

12. The method of claim 10, further comprising:
receiving information indicating that the one or more transcoders are encoding a degraded input channel and are discontinuing encoding of the first plurality of frames.

13. The method of claim 10, wherein the data comprises statistical information resulting from motion estimation, and wherein the statistical information comprises at least one of:
a measure of similarity between consecutive frames of the plurality of frames,
a sum of absolute transformed differences (SATD),
a sum of absolute differences (SAD),
a histogram of oriented gradients (HOG),
a quantized HOG,
a histogram of edges, or
a quantized histogram of edges.

14. The method of claim 10, wherein the timing information comprises a timestamp, and wherein the synchronizing the first plurality of frames comprises:
synchronizing, based on the matching and the timing information, a timestamp for each frame of the second plurality of frames to correspond with a timestamp in a frame of the first plurality of frames.

15. The method of claim 10, wherein each transcoder of the plurality of transcoders is located at a different data center or associated with a different instance in a cloud platform.

16. The method of claim 10, wherein the one or more matching content features comprise at least one of: a frame type, a similarity between one or more motion vectors, a color, or a resolution.

17. A method comprising:
receiving data associated with a first plurality of frames encoded by one or more transcoders, wherein the data indicates, for each frame of the first plurality of frames, a frame type and timing information;
determining, based on the data and during encoding of a second plurality of frames, a degree of similarity between the first plurality of frames and the second plurality of frames, wherein the degree of similarity indicates one or more matching content features;
synchronizing, based on the matching and the timing information, a timestamp for each frame of the second plurality of frames to correspond with a timestamp in a frame of the first plurality of frames; and
encoding, based on the synchronizing, the second plurality of frames.

18. The method of claim 17, wherein each transcoder of the plurality of transcoders is located at a different data center or associated with a different instance in a cloud platform.

19. The method of claim 17, wherein the one or more matching content features comprise at least one of: a frame type, a similarity between one or more motion vectors, a color, or a resolution.

20. The method of claim 17, wherein the data comprises statistical information resulting from motion estimation, and wherein the statistical information comprises at least one of:
a measure of similarity between consecutive frames of the plurality of frames,
a sum of absolute transformed differences (SATD),
a sum of absolute differences (SAD),
a histogram of oriented gradients (HOG),
a quantized HOG,
a histogram of edges, or
a quantized histogram of edges.

* * * * *